Patented Feb. 26, 1929.

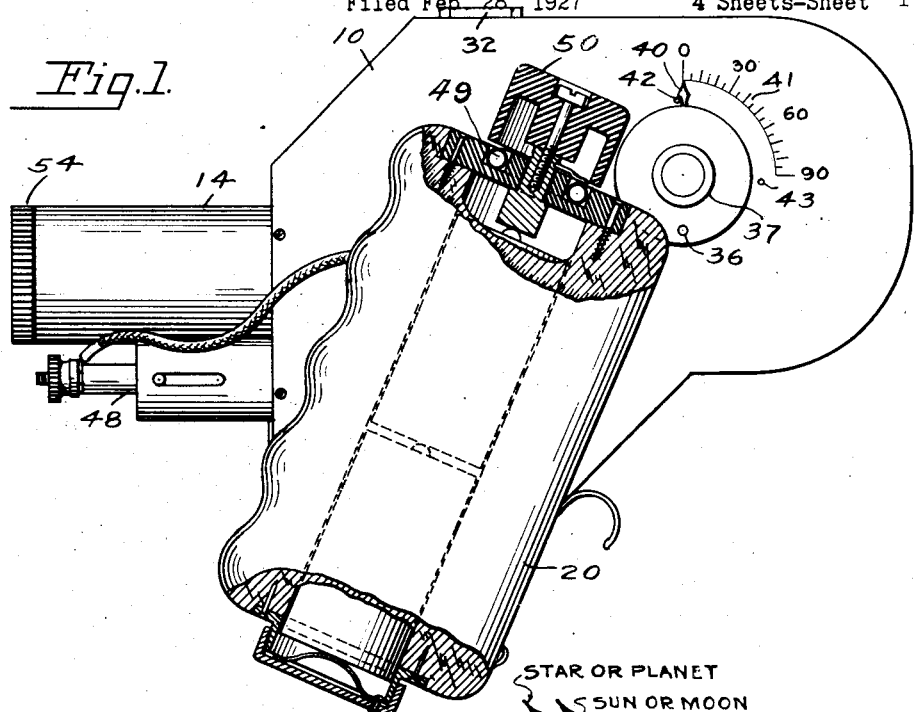
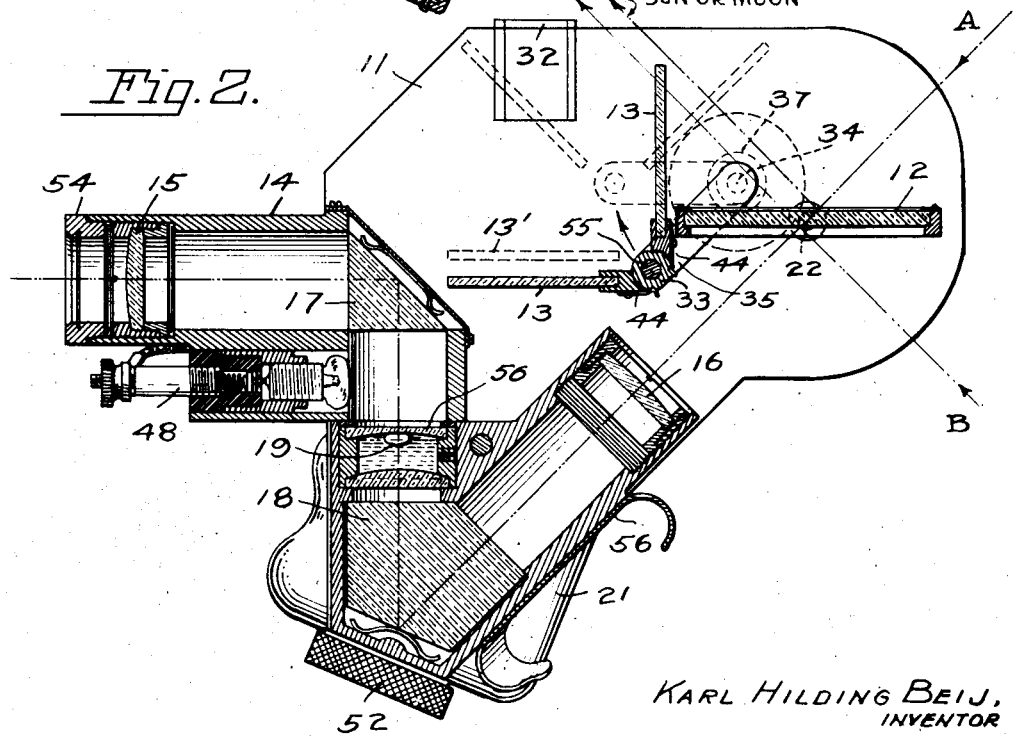

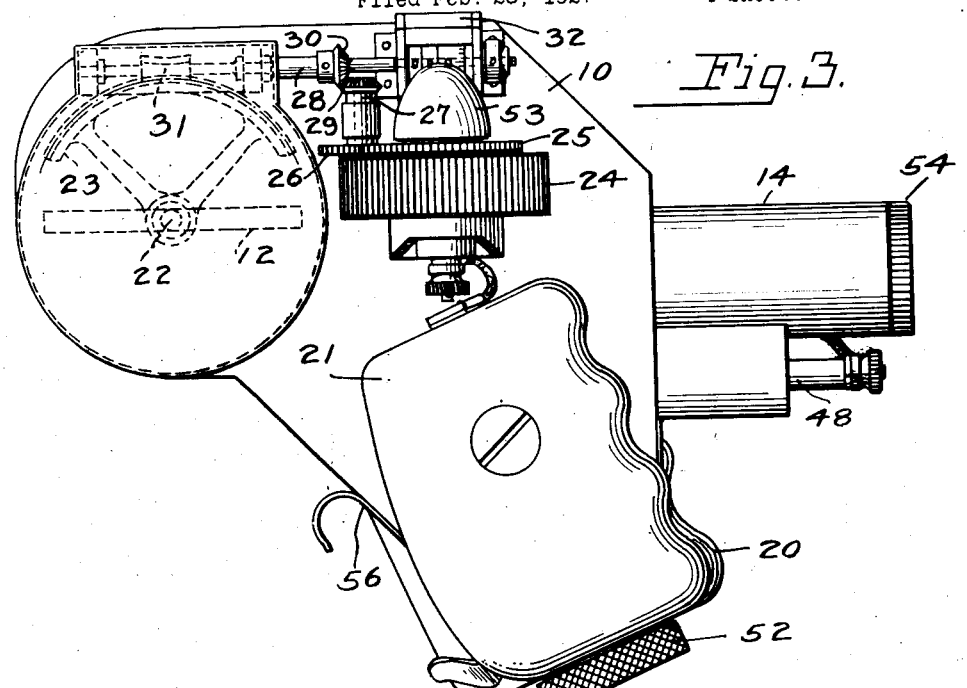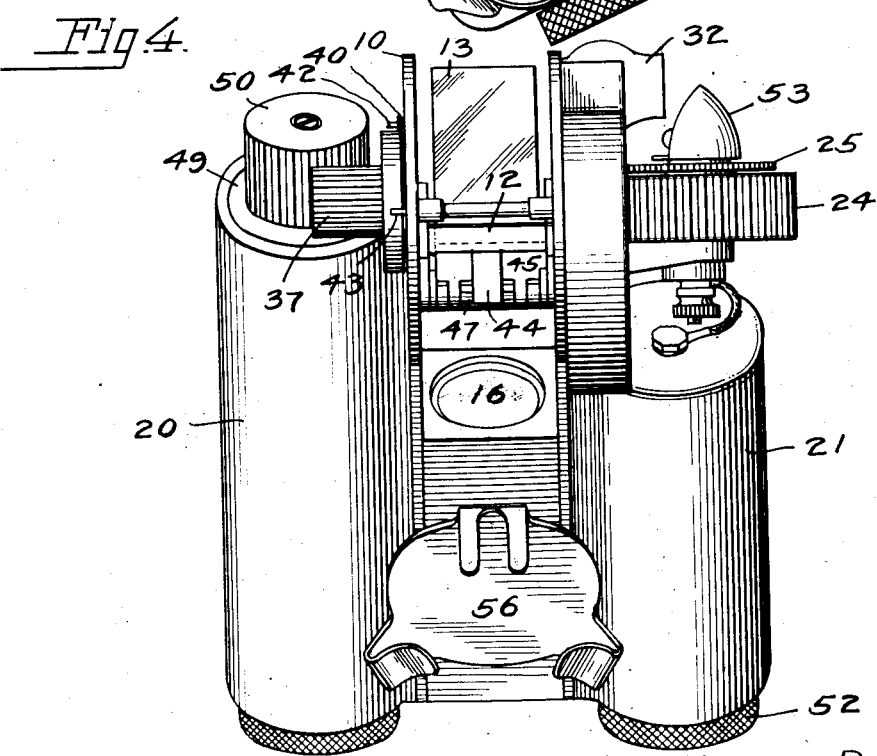

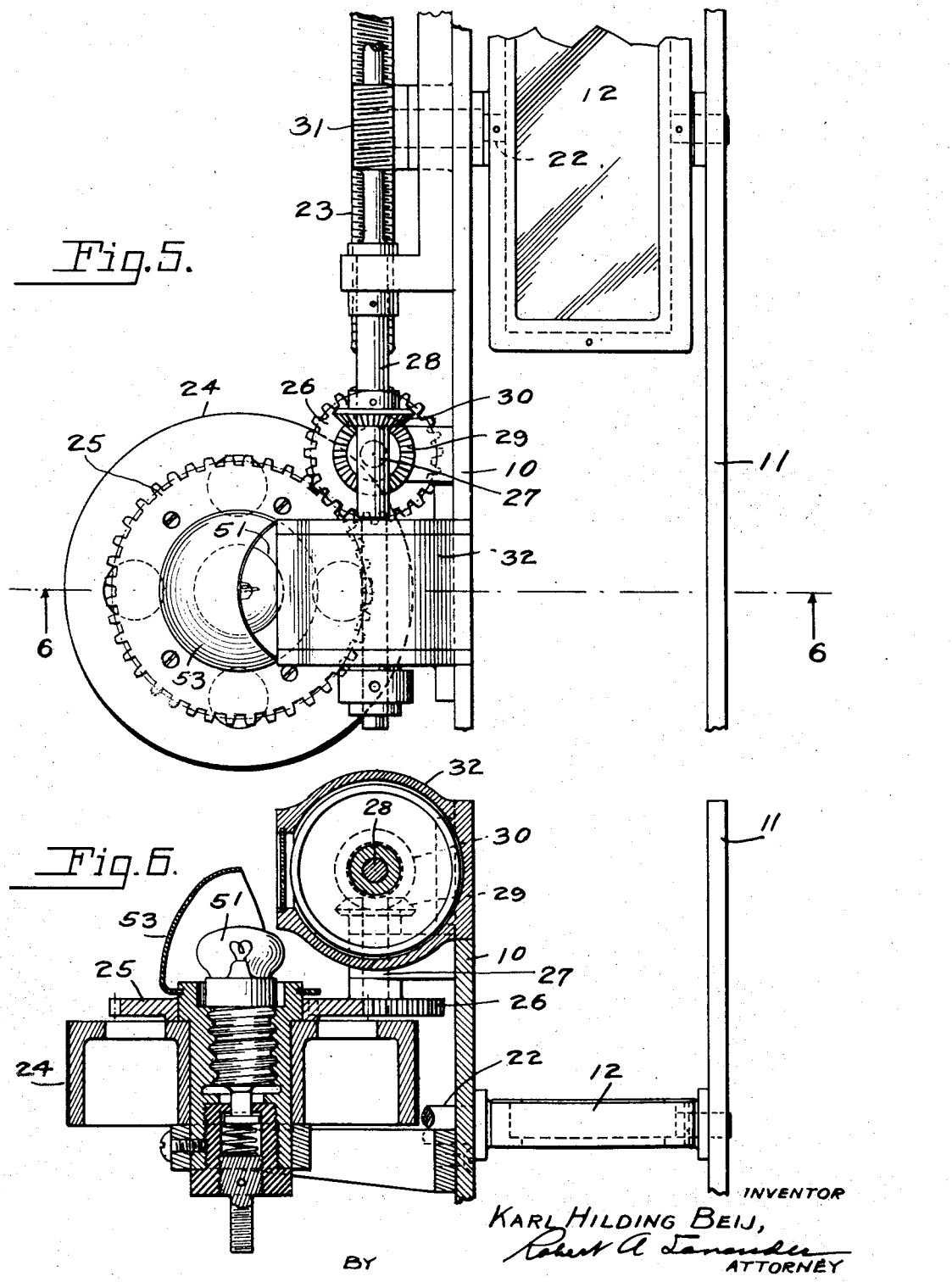

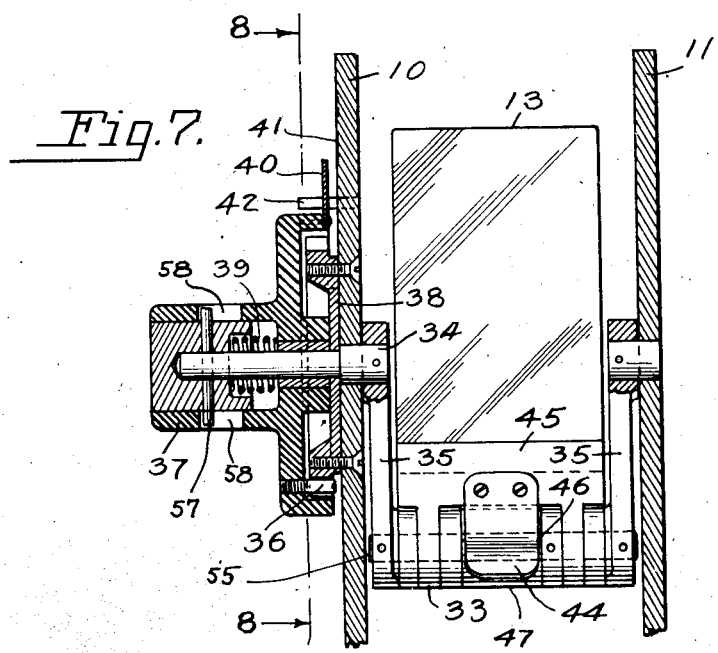

1,703,705

UNITED STATES PATENT OFFICE.

KARL H. BEIJ, OF WASHINGTON, DISTRICT OF COLUMBIA.

MEANS FOR DETERMINING ALTITUDE.

Application filed February 28, 1927. Serial No. 171,600.

My invention relates broadly to a means for determining altitude and more particularly to a sextant of the bubble type.

An object of the invention is to provide a device of the character described with means for setting, locking in position, and indicating the angular relation of sun glasses with respect to the horizon.

Another object is to provide a sextant having means for simultaneously adjusting and recording the angular relation of an index mirror with respect to the horizon.

A further object is to provide a sextant in which the sun glasses and index mirror may be adjusted without releasing hold of the handgrips of the instrument.

With the above objects in view the invention consists in the construction, combination and arrangement of parts as will be hereinafter more fully described.

Reference is to be had to the accompanying drawings forming part of this specification in which like reference characters indicate corresponding parts throughout the several views, and in which:

Figure 1 is a side elevation of my invention partly in section,

Figure 2 is a central vertical longitudinal section of Figure 1,

Figure 3 is a view of the side opposite to that shown in Figure 1,

Figure 4 is a front view,

Figure 5 is a detail plan view of the dual setting and recording mechanism of the index mirror, Figure 6 is a view on the line 6—6 of Figure 5, Figure 7 is a detail of the recording gauge for the index mirror, and Figure 8 is a view on the line 8—8 of Figure 7.

Referring more particularly to the drawings, 10 and 11 are a pair of parallel side plates between which are positioned the index mirror 12, sun glasses 13, and telescope 14 that includes lenses 15 and 16, prisms 17 and 18, and a levelling bubble 19. Hand grips 20 and 21 are provided on the exterior of the plates.

The index mirror 12 is a strip of unsilvered optical glass with paralled upper and lower polished surfaces. A piece of optical glass thus prepared will reflect objects at the same time that it permits objects to be viewed through it. It is mounted on a shaft 22 having bearings in the side plates and extending through the plate 10, and on which is mounted a segment 23 having a serrated arc. A knurled thumb wheel 24 is so positioned that it is easily operated without releasing hold of the hand grip 21 and has secured to it a gear 25 that engages with a smaller gear 26 mounted on a shaft 27. Motion is transmitted by this shaft to shaft 28 through bevel gears 29 and 30. A worm gear 31 secured to shaft 28 engages with the serrated arc of the segment causing the angular relation of the index mirror to change by operation of the thumb wheel 24. The ratio of gearing may be such that one turn of the thumb wheel corresponds to two revolutions of the worm gear and one revolution of the worm gear moves the index mirror one degree. One degree of motion of the index mirror corresponds to two degrees of altitude, thus one revolution of the worm gear gives a two degree altitude change to the mirror. I do not desire to limit myself to this precise ratio, as others may be used equally as well. Shaft 28 also operates a registering device 32, that may be of any desired type, suitably calibrated.

The sun glasses 13, for the purpose of dimming the image of the sun, are adapted to be swung over the index mirror, when using the instrument in the day time, so as to be interposed in the direct rays of the sun between the mirror and the sun. The glasses are mounted in frames carried on the hinged member 33 that is so arranged that either section may be moved independently or the two sections may be moved as a unit. The member 33 is mounted on pinion 55 that is connected to shaft 34 by arms 35. A knob 37, slidably carried by the shaft 34 and secured thereto by a key 57 passing through the shaft and operable in slots 58 in the knob, regulates the angular adjustment of the sun glasses. A pin 36 secured to the knob engages with a toothed member 38 carried by the side plate 10 to maintain the glasses in the desired angular adjustment. Spring 39, under tension, holds the knob in its innermost position effecting engagement of the pin 36 with the toothed member 38. There is a pointer 40 on the knob to indicate the position of the sun glasses according to graduations 41 on the plate 10, stop pins 42 and 43 limiting its movement to 90 degrees. Spring clips 44 connected to the frames 45 engage in notches 46 on block 47 holding the glasses in any desired angular relation to each other. This assembly permits of the rapid adjustment of the sun glasses, for, the approximate altitude of the sun being known, it is only necessary to pull out the knob 37 against the tension of the spring 39, turn it until the pointer 40 points to the approximate altitude of the sun on the graduations 41. The knob is then released, the pin 36 engaging in the toothed member 38 holds the glasses in the desired position. It is to be noted that this can be done with the thumb and forefinger of the left hand without releasing the grip of that hand on the handgrip 20.

When using the instrument during the day, sufficient light is admitted through the telescope opening to illuminate the bubble but at night artificial light is required. I, therefore, mount an electric light assembly 48, slidable fore and aft, so that its rays may be concentrated on the bubble, its intensity of illumination being controlled by a rheostat 49 located at the upper end of the hand grip 20 in which is placed a battery for the source of current. The rheostat is controlled by knob 50.

A means 51 for illuminating the index mirror registering device 32 is located inside the thumb wheel 24, as may be more clearly seen in Figure 6, and is controlled by a switch 52 in the bottom of the hand grip 21 in which is placed the battery for this lamp. A reflector 53 concentrates the light on the registering device.

A removable threaded cap 54 holds an auxiliary shaded or colored disk of celluloid for darkening the interior of the instrument when used in extremely bright sunlight.

I also provide a bracket 56 secured to the housing between the hand grips for holding a stop watch for recording the exact time of taking a bearing.

In operating the instrument in the day time, the observer's eye is placed approximately at the point marked "A" in Fig. 2, so that he looks downwardly at an angle at the index mirror 12 and sees the sun reflected therein, dimmed by the sun glasses if desired. Simultaneously he sees the image of the bubble 19 which is projected by the lens 16 through the index mirror 12. The images of the bubble and sun should coincide on the index mirror before an accurate reading is obtained. They are brought into coincidence by a careful adjustment of the index mirror by means of the thumb wheel 24. Heretofore in instruments of this character, the sunglasses have been so positioned that they come between the observer's eye and the index mirror. This not only dims the image of the sun, but also greatly dims the clearness of the image of the bubble, which would lead to the obtaining of an inaccurate reading. In the arrangement of the sunglasses hereinabove described, the observer has an open unrestricted view of the index mirror, yet the image of the sun is sufficiently shaded to cause no inconvenience to the observer. At night time when sighting on one of the lesser luminaries, it is preferable to place the eye under the index mirror at approximately the position marked "B" in Fig. 2, the observer looking upwardly through the index mirror and directly at the luminary. The mirror is then adjusted by means of the thumb wheel 24 until the image of the bubble is reflected in the mirror to coincide with the luminary as viewed through the index mirror. The bubble lens 16 is a collimating lens. The bubble 19 is in the focal plane of the lens 16, and the radius of curvature of the upper lens 56 of the bubble horizon is made equal to the focal length of the lens 16. The bubble is thus optically at infinity and the coincidence setting may be made at any point of the field as long as the bubble does not touch the sides of the container. In this way no centering cross wires are needed. If a natural horizon is available, the bubble may be disregarded and the horizon viewed directly through the telescope 14.

It will be understood that the above description and accompanying drawings comprehend only the general and preferred embodiment of my invention and that various changes in minor details of construction, proportion and arrangement of parts may be resorted to within the scope of the appended claims and without sacrificing any of the advantages of my invention.

What I claim is—

1. A bubble sextant including in combination a frame, hand grips arranged on either side of the frame, illuminating members mounted on the grips, an index mirror pivotally mounted in the frame, means for pivoting and determining the angular adjustment of the mirror, a curved bubble container, a collimating lens having a focal length equal to the radius of the curvature of the container and situated between the index mirror and the container, a shaft within the frame, blocks provided with notches secured to the shaft, a plurality of sun glasses mounted on the shaft, clips carried by the sunglasses engageable with the notches whereby the sunglasses may be angularly varied with respect to each other, a retractible means for rotating the shaft for angular disposition of the sunglasses with respect to the index mirror, a toothed member secured to the frame, means carried by the retractible means and engaging the toothed member for maintaining the sunglasses in a desired angular adjustment, and manually controlled means in each of the grips for energizing the illuminating members.

2. A bubble sextant including in combination a frame, hand grips on the frame, illuminating members carried by the grips, an index mirror adjustably mounted in the frame, means for adjusting and determining the angular position of the mirror, a curved bubble container, a collimating lens between the index mirror and container, adjustable sunglasses mounted in the frame and adapted to be interposed singly or as a unit between a luminary and the index mirror, means for maintaining the sunglasses in angular relation with respect to each other, retractible means for pivoting the glasses within the frame and determining their angular position with respect to the mirror, and means within the grips for energizing the illuminating members.

KARL H. BEIJ.